April 9, 1957 J. MARAS 2,788,435
FERRULE
Filed Dec. 6, 1954

INVENTOR.
Joseph Maras
BY Clyde H. Haynes
his Attorney

United States Patent Office 2,788,435
Patented Apr. 9, 1957

2,788,435

FERRULE

Joseph Maras, Lorain, Ohio, assignor to Gregory Industries, Inc., Detroit, Mich., a corporation of Michigan Application December 6, 1954, Serial No. 473,313

4 Claims. (Cl. 219—136)

The present invention relates to a ferrule for use during the welding of studs to plates and in particular to a ferrule which will locate the stud relative to the edge of the plate to which it is to be welded.

In the past many various sizes and shapes of ferrules have been constructed for use in welding studs of many various sizes and shapes to surfaces of work pieces or plates. However, in all of these designs there was no provision wherein the ferrule had a portion which would engage the edge of the work piece to locate the stud relative thereto.

Therefore, one of the objects of the present invention is to provide a ferrule which will locate the stud relative to the edge of the work piece during welding.

Another object of the invention is to provide a locating ferrule which is simple in construction and economical to manufacture.

A further object of the invention is to provide a ferrule for stud welding which will locate the stud relative to the edge of a work piece and which will be beneficial to the actual welding of the stud.

Other objects and a fuller understanding of the invention will become apparent from the description and claims and the drawings in which:

Figure 1:
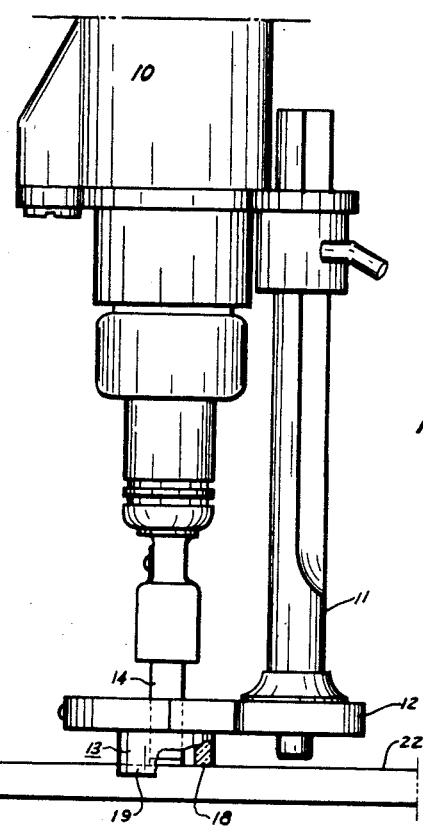
Figure 1 is an elevational view partly in section showing the ferrule on the end of the stud welding gun and in position for welding.
Figure 2:
Figure 2 is a top view of the ferrule.
Figure 3:
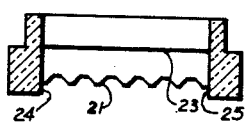
Figure 3 is a sectional view taken along the line 3—3 of Figure 2.

A stud welding gun 10 having a leg 11 and a foot 12 for supporting a ferrule 13 is illustrated in Figure 1. The leg 11 may be attached to a gun as disclosed in Patent Number 2,416,915, issued to Evans March 4, 1947. It is understood that the ferrule 13 illustrated here can be used in other holding fixtures besides the one illustrated. In Figure 1 a rectangular stud 14 is to be welded to a bar 15 having a width substantially equal to the width of the stud 14. The ferrule 13 locates the stud 14 and keeps it in proper alignment for welding to the bar 15.

Figure 4:
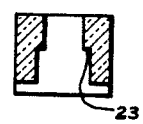
Figure 4 is a sectional view taken along the line 4—4 of Figure 2.
Figure 5:
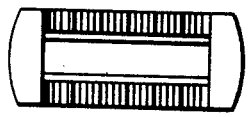
Figure 5 is a bottom view of the ferrule.

As is best illustrated in Figures 2 to 5 inclusive, the ferrule 13 has opposite side walls 17 and 18 and opposite end walls 19 and 20 respectively. Each of these side walls 17 and 18 have teeth such as the teeth 21 in Figure 3 which seat against the surface 22 of the bar 15 to which the stud 14 is to be welded. The teeth 21 provide sufficient venting of gases formed during the existence of the welding arc, although it is understood that other means may be used instead of the teeth 21 to provide for such venting. The side walls 17 and 18 are each provided with a shoulder such as shoulder 23 in Figure 3 which extends parallel to the teeth and provides an enlarged cavity space along the teeth as illustrated in Figure 4. This cavity space forms a fillet along each side of the stud 14 during welding to strengthen the weld between the stud 14 and the bar 15.

The end walls each have a plain internal face and extend outwardly beyond the teeth on the side walls. These portions are termed the locating portions 24 and 25 of the respective end walls 19 and 20. As is illustrated in Figure 1, the locating portions 19 and 20 engage the edges of the flat bar 15 to which the stud 14 is to be welded to locate the ferrule 13 on the surface 22 of the flat bar 15.

In using the ferrule in welding stud 14 to bar 15 the ferrule is inserted in the ferrule holding part of the gun in the same manner as other ferrules used in the past. The gun is positioned with the stud 14 against the flat bar 15 in such manner that the locating portions 24 and 25 engage the edge of the bar 15 to properly locate the stud 14 relative thereto. While the gun is held steady in this position, the welding of the stud to the bar is consummated in the well known manner.

In the particular design illustrated a rectangular stud is used in conjunction with a rectangular ferrule for welding the stud to the surface of a bar having a width substantially equal to that of the stud. It is understood, however, that studs of various sizes and shapes may be welded to the surfaces at a located point relative to the edge of the surface of the bar or work plate. For example, if the stud is other than rectangular, the ferrule is made to conform to the shape of the stud. In such cases the ferrule has at least a wall provided with an edge adapted to seat against the surface of the bar or work plate. The ferrule also has a portion extending outwardly beyond the edge which seats against the surface. This portion which extends outwardly is adapted to engage the edge of the bar or work plate to locate the ferrule on the surface of the work plate and thereby locate the stud at a fixed point relative to the edge of the work plate.

Although this invention has been described in its preferred form with a certain degree of particularity enabling others to reproduce the invention, it is understood that the present disclosure has been made by way of example and that numerous modifications and changes in the details may be resorted to without departing from the spirit and scope of the invention as defined in the claims which are made a part hereof.

The embodiments of the invention in which an exclusive property or privilege is claimed are defined as follows:

1. A locating ferrule for stud welding a rectangular shaped stud to the surface of a bar of the same width, said ferrule having opposite side walls and opposite end walls, said side walls each having teeth on one edge thereof adapted to seat against the surface of a bar, said side walls each having an internal shoulder extending parallel to the teeth and providing an enlarged cavity space along the teeth, said end walls each having a plain internal face and extending outwardly beyond the teeth on the side walls whereby the end walls engage the edge of a flat bar to which a stud is to be welded to locate the ferrule on the surface of the flat bar.

2. A locating ferrule for stud welding a rectangular shaped stud to the surface of a bar, said ferrule having opposite side walls and opposite end walls, said side walls each having teeth on one edge thereof adapted to seat against the surface of a bar, said side walls each having an internal shoulder extending parallel to the teeth and providing an enlarged cavity space along the teeth, said end walls each having a portion extending outwardly beyond the teeth on the side walls and adapted to engage the edge of a flat bar to which a stud is to be welded to locate the ferrule on the surface of the flat bar.

3. A locating ferrule for stud welding a rectangular shaped stud to the surface of a bar of the same width, said ferrule having opposite side walls and opposite end walls, said side walls each having teeth on one edge thereof adapted to seat against the surface of a bar, said end walls each having a plain internal face and extending outwardly beyond the teeth on the side walls whereby the end walls engage the edge of a flat bar to which a stud is to be welded to locate the ferrule on the surface of the flat bar.

4. A locating ferrule for stud welding a rectangular shaped stud to the surface of a bar, said ferrule having opposite side walls and opposite end walls, said side walls each having teeth on one edge thereof adapted to seat against the surface of a bar, said end walls each having a portion extending outwardly beyond the teeth on the side walls and adapted to engage the edge of a flat bar to which a stud is to be welded to locate the ferrule on the surface of the flat bar.

References Cited in the file of this patent

UNITED STATES PATENTS

| | | |
|---|---|---|
| 2,416,204 | Nelson | Feb. 18, 1947 |
| 2,421,184 | Candy | May 27, 1947 |